(12) United States Patent
McComb

(10) Patent No.: US 6,419,238 B2
(45) Date of Patent: *Jul. 16, 2002

(54) WATERTIGHT SEAL FOR INCLINED SURFACES

(76) Inventor: Barry Hugh McComb, 118 Spur Road, Orpington Kent BR6 0QW (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/326,309

(22) Filed: Jun. 7, 1999

(51) Int. Cl.[7] ............................. A47K 3/16; F16J 15/02
(52) U.S. Cl. ........................... 277/630; 277/637; 52/35
(58) Field of Search ................. 277/628, 630, 277/637, 904, 906; 52/60, 62, 58, 35, 302.6, 61

(56) References Cited

U.S. PATENT DOCUMENTS

| | | | | |
|---|---|---|---|---|
| 1,442,172 A | * | 1/1923 | Nelson | 52/58 |
| 1,939,115 A | * | 12/1933 | Fritsche | 52/35 |
| 3,562,971 A | * | 2/1971 | Göbel | 52/60 |
| 3,667,177 A | * | 6/1972 | Biela | 52/35 X |
| 4,190,989 A | * | 3/1980 | Sakharoff | 52/60 |
| 4,204,376 A | * | 5/1980 | Calvert | 52/35 X |
| 4,671,026 A | * | 6/1987 | Wissinger | 52/35 |
| 4,691,392 A | * | 9/1987 | Whitney | 52/35 X |
| 4,817,344 A | * | 4/1989 | Wissinger | 52/35 |
| 5,123,208 A | * | 6/1992 | Kirby et al. | 52/60 X |
| 6,203,025 B1 | * | 3/2001 | Hayton | 277/906 X |

* cited by examiner

Primary Examiner—Robert G. Santos
(74) Attorney, Agent, or Firm—Fildes & Outland, P.C.

(57) ABSTRACT

A seal for sealing between two surfaces inclined to each other, the seal comprising first and second strips which are interlocatable with each other to allow telescopic movement therebetween, when viewed in cross-section, during use, the first strip having a section defining a first outer surface of the seal and the second strip having a section which at least partially overlies the first strip section in sliding engagement therewith to define a second outer surface of the seal, wherein at least one of the two strips comprises an additional section which is securable to an adjacent surface and to which the outer surface-defining section of said at least one strip is securable or secured detachably.

24 Claims, 7 Drawing Sheets

WATERTIGHT SEAL FOR INCLINED SURFACES

This invention relates to a seal for providing a watertight seal at a juncture between two surfaces which are inclined to each other, usually at substantial right angles to each other, and which tend to undergo relative movement. The inventive seal is especially, but not exclusively, concerned with a flexible elongate seal for application to an item of sanitaryware, such as a bath, basin or shower tray, to prevent the ingress of water between the sanitaryware item and an adjacent wall or other surface against which the item is installed. The inventive seal also has other applications where a seal, preferably a flexible elongate watertight seal, is required between two inclined surfaces, for example, between a floor and a wall between a wall and a ceiling or between a worktop surface and an adjacent wall or wall tiles.

In my co-pending British Patent Application No. 9511221.5 (Publication No. 2289924), there is disclosed a seal for sealing between two surfaces at substantial right angles to each other, the seal comprising first and second preformed, liquid-impervious strips having respective interlocatable members, the first strip being generally L-shaped with its interlocatable member being constituted by one limb thereof and the other limb thereof providing a first outer surface and a sealing edge, and the interlocatable member of the second strip having a surface which overlies the one limb of the first strip to form a second outer surface. In this manner, the first and second outer surfaces of the assembled and installed seal provide a gravity water run-off surface, as well as a drip strip. Also, the leading edges of the upstanding one limb of the first strip and of the surface of the other limb (drip-strip) of the second strip which overlies that one limb, may be enlarged in section by a sufficient amount to provide a contact fit with each other, so forming a sliding seal to prevent the risk of water penetrating the interior of the seal by capillary action. Those enlarged section edges can also serve to form a "clip together" action between the two strips, the purpose being to facilitate assembly, installation and adjustment of the seal with respect to the two inclined surfaces to which it is applied. Further, the two strips, when interlocated together, allow relative, usually vertical, sliding or telescopic movement by varying the degree of overlap, when seen in section. The strips may also be sufficiently flexible to allow a degree of longitudinal movement therebetween, whilst maintaining the water run-off and drip capability of the seal.

However, it has been found that, because the two strips are preformed as unitary components of the seal, difficulties can arise, in certain circumstances, in the installation of the seal, particularly with regard to the securement of the second strip to an adjacent surface, such as a wall, and the subsequent interlocation of the first strip with respect to the second strip, as well as the application of any adhesive and/or sealant between the two strips and adjacent surfaces, such as a wall and the rim of a bath.

Thus, an object of the present invention is to provide a seal which overcomes, or at least substantially reduces, the disadvantages associated with not only the seal described above but also other known forms of elongate seals, sealing strips and the like.

Accordingly, the invention provides a seal for sealing between two surfaces inclined to each other, the seal comprising first and second strips which are interlocatable with each other to allow telescopic movement therebetween, when viewed in cross-section, during use, the first strip having a section defining a first outer surface of the seal and the second strip having a section which at least partially overlies the first strip section in sliding engagement therewith to define a second outer surface of the seal, wherein at least one of the two strips comprises an additional section which is securable to an adjacent surface and to which the outer surface-defining section of said at least one strip is securable or secured detachably.

Preferably the so-defined first and second outer surfaces of the seal are substantially contiguous with each other, to provide an overall outer facia surface for the seal, as well as a gravity water run-off and, optionally, a drip strip therefor.

With the outer surface-defining section of the or each strip detachably secured or securable to the additional section thereof, then a snap-fit arrangement therebetween is preferred.

In a preferred embodiment of the inventive seal to be described hereinbelow, both strips have additional sections to which their respective outer surface-defining sections can be secured, again preferably detachably.

However, if only one of the first and second strips has such an additional section for securing it to an adjacent surface, then the second strip is preferred. This is because the second strip is normally secured to an adjacent surface, such as a wall surface, in which case, its additional section can be so-secured quite readily, before the first strip is placed in position with respect to it and adjacent its associated surface, such as the rim of a bath, for subsequent securement of the second outer surface-defining section of the second strip to that additional section, so that the respective members of the strips are interlocated, with the second outer surface-defining section of the second strip at least partially overlying the first strip section which defines the first outer surface of the seal.

Also, when both the first and second strips have respective additional sections, then those two additional sections are preferably provided with means for positioning themselves in proper relationship with respect to each other, during and after installation of the seal. Such positioning means may comprise complementary formations on the respective additional sections. For example, a loose-fit male/female arrangement may be used, to allow for the telescopic and, optionally, relative longitudinal movement between the first and second strips after installation of the seal between, say, a wall and a bath rim.

The first strip preferably has an upstanding member which is interlocated or interlocatable with the second strip, to allow the relative movement therebetween. That interlocatable member is preferably a part of the first outer surface-defining section of the first strip and may be inserted or insertable between the second outer surface-defining section and any additional section of the second strip, to allow such lateral relative movement between the two strips after installation of the seal. The upstanding interlocatable member of the first strip may be provided, preferably at its free end, with a lip which is in sliding and wiping contact with an adjacent inner surface of the second strip, to assist in the prevention of the ingress of water into the interior of the installed seal. That adjacent surface of the second strip is preferably an inner surface of the second outer surface-defining section of that strip remote from or opposite the second outer surface defined thereby.

The first outer surface-defining section of the first strip may be provided with a lip portion, preferably remote from any upstanding interlocatable member thereof, which is arranged to engage the surface, such as the rim of a bath to which the first strip is secured, and, optionally, to provide a cover for any mastic or adhesive located thereunder.

The additional section of the at least one strip can be provided with at least one foot for spacing that section, and hence the corresponding strip(s), from the adjacent surface (s) against which the seal is installed. The so-formed space (s) between the at least one strip and adjacent surface(s) can accommodate an adhesive, such as a mastic, for sealing the corresponding strip(s) to that surface(s). Also, the or each additional section may be provided with through holes, to allow adhesive and/or mastic to flow therethrough and, when set, to enhance the sealing effect between the seal and adjacent surfaces.

In one embodiment of the inventive seal, there is provided a further section to which the additional section of either the first or second strip can be attached, again preferably detachably, and which can assist in the securement of the seal to an adjacent wall, particularly during tiling thereof, as will be described in more detail hereinbelow. Such a further section may be provided for each of the first and second strips of the seal.

Also, the inventive seal may be provided in the form of a kit of parts comprising at least:

the first and second outer surface-defining sections of respective first and second strips of the seal;

at least one, and preferably both, of the respective additional section therefor, as defined in accordance with the invention hereinabove; and the further section to which the additional section of the corresponding first or second strip is detachably secured or securable.

In a preferred form of such seal kit, five parts, namely the first and second outer-surface defining sections, both additional sections therefor and the further section, are provided.

In this manner, when the seal is installed between, say, the rim of a bath and a wall during tiling thereof, a portion of the further section secured to the additional section of, say, the second strip of the seal, can be located behind a row of tiles whilst they are being adhered to the wall.

Alternatively, when the seal is installed between, say, the rim of a bath and an existing tiled wall, then the further section can be discarded and the additional section of, say, the second strip of the seal can be adhered, or otherwise secured, directly to any existing row of tiles.

If, for instance, the seal is to be installed between a wall and floor in the region of the juncture thereof, then the kit may comprise six basic parts, namely the first and second outer surface-defining sections, both additional sections therefor and two further sections to be attached to respective ones of the two additional sections, so that portions of the respective further sections can be applied behind a row of wall tiles, or other wall covering, and beneath a row of floor tiles, or other floor covering, during installation thereof.

Alternatively, one or both of the further sections can be discarded if one or both of the additional strip sections is/are to be secured directly to either an existing wall or floor covering or both.

The component parts of the seal are preferably extruded from a plastics material or other suitable flexible and waterproof material.

The invention also provides an installation of a watertight seal at a juncture between two surfaces inclined to each other, comprising a seal in accordance with the invention as defined above, wherein the first and second strips of the seal are interlocated with each other to allow telescopic movement therebetween, with the additional section of said at least one of the strips being secured to an adjacent one of the two inclined surfaces and with the outer surface-defining section of said at least one strip being secured detachably to the additional section. The two inclined surfaces are usually at substantial right angles to each other.

Thus, the invention provides a watertight seal between a pair of inclined surfaces, with the first and second strips of the seal being capable during use of telescopic movement of several millimeters therebetween without jeopardising the integrity of the seal. Also, the detachability of the outer surface-defining section of the at least one strip when secured to the additional section, facilitates installation of the seal, particularly at vertical corner regions of the pair of inclined surfaces, such as wall corners, for example, the securement of at least the second strip to an adjacent surface, such as a wall, and the subsequent interlocation of the first strip with respect to the second strip, as well as the application of any adhesive and/or sealant between the strips and adjacent surfaces, such as a wall and the rim of a sanitaryware item, like a bath.

Further, sliding engagement between the two sections of the strips enables smooth telescopic movement between the two strips, whilst also contributing to the maintenance of the integrity of the seal.

Preferred embodiments of seal in accordance with the invention will now be described by way of example and with reference to the accompanying drawings in which.

Figure 1:
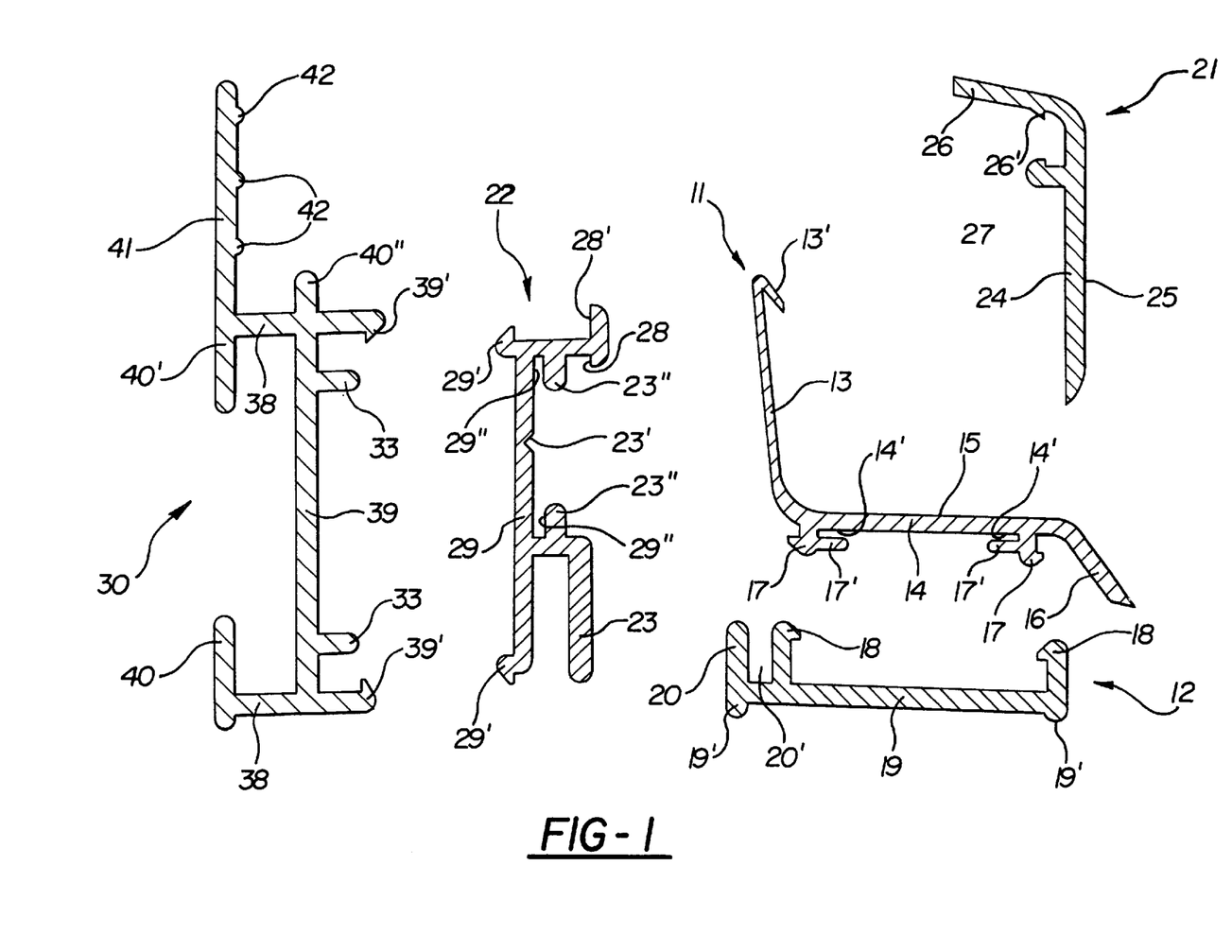
FIG. 1 is an exploded, sectional view of a first embodiment of seal.
Figure 2:
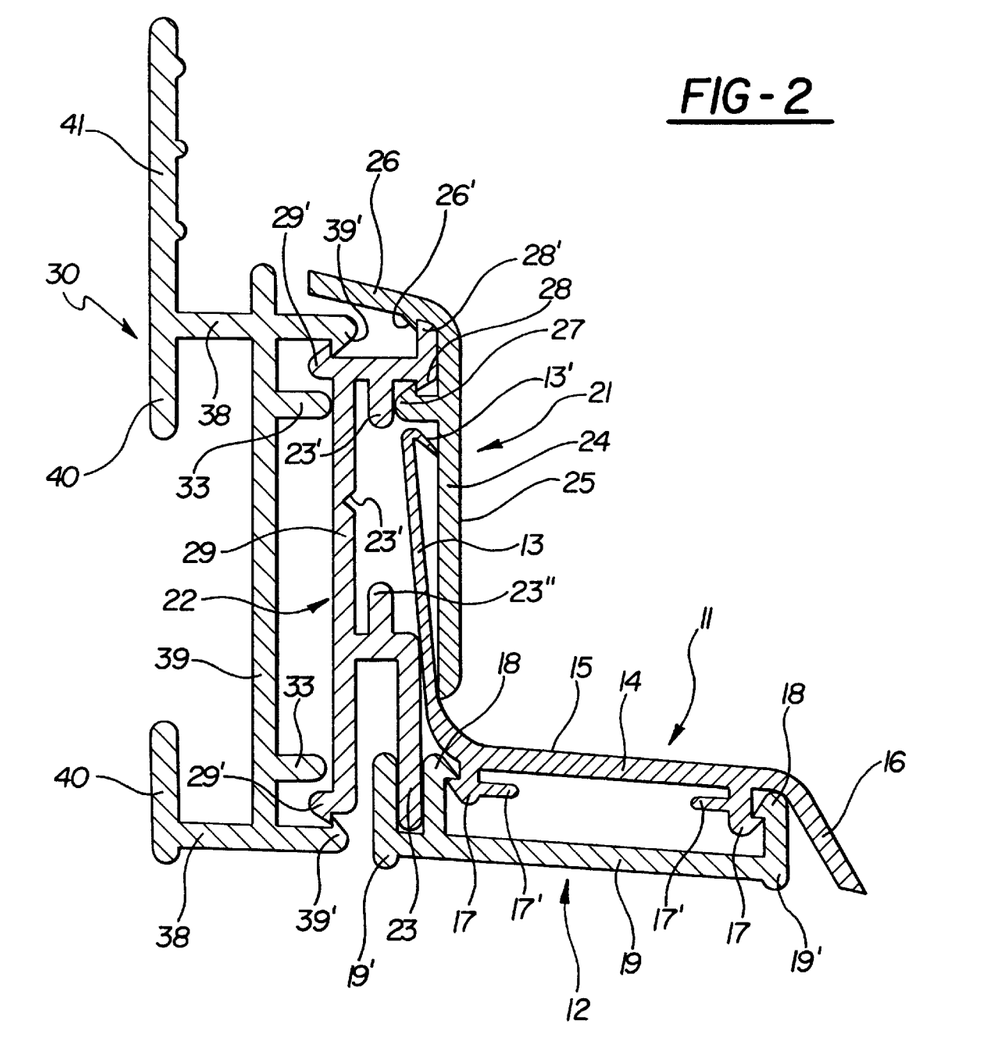
FIG. 2 is a sectional view of the seal shown in FIG. 1 but in an assembled condition.

Referring firstly to FIGS. 1 and 2 of the drawings, a first embodiment of seal comprises five basic component sections 11, 12, 21, 22 and 30 each extruded from a plastics material.

The sections 11 and 12 constitute a first strip of the seal, with the section 11 having an upstanding member 13 which is interlocatable with a second strip of the seal constituted by the sections 21 and 22, as will be described in more detail hereinbelow.

The section 11 has a portion 14 which defines a first outer surface 15 of the seal and a further portion 16 depending downwardly at an acute angle to the portion 14 at the end thereof remote from the interlocatable member 13, to provide a lip portion.

Depending downwardly from either end of the portion 14 is a pair of spaced latch members 17 which are engageable with correspondingly-shaped upstanding latch members 18 on a generally planar portion 19 of the additional section 12 of the first strip of the seal, to enable the two sections 11 and 12 to be detachably snap-fitted together. An upstanding member 20 at the left hand end of the portion 19 is spaced from the left hand upstanding latch member 18 to provide a slot 20' therebetween. A pair of feet 19' are also provided at respective ends of the portion 19.

A portion 24 of the section 21 of the second strip of the seal defines a second outer surface 25 thereof A further portion 26 of the section 21 extends at an angle to the portion 24 from the top end thereof Latch members 27 and 26' are arranged to snap-fit together with respective latch members 28 and 28' provided on the additional section 22 of the second strip of the seal.

That additional section 22 comprises a portion 29 having respective latch members 29' at either end thereof and an extended dog-leg portion 23 whose free end is arranged to be received freely within the slot 20' of the additional section 12 of the first strip of the seal, to provide a loose-fitting male/female arrangement therebetween. A generally V-shaped groove 23' in the outer surface of the section portion 29, facilitates bending of that portion during installation of the seal, as well as facilitating the receipt of a fixing pin and providing a recess for accommodating the head of the fixing pin. This is particularly advantageous when the surface of a wall to which the seal is installed is uneven.

The further section 30 of the seal comprises a main portion 39 having, at respective ends thereof, outwardly-extending latch members 39' with which the latch members 29' of the section 22 are snap-fittingly engageable.

A pair of spaced members 33 project from the outer surface of the portion 39, to engage the inner surface of the portion 29 of the section 22, thus providing the required spacing between the section 22 and section 30 during and after installation of the seal.

At the ends of the portion 39, respective bridge portions 38 are connected to respective upstanding and depending portions 40 and 40', with a further portion 41 upstanding from the upper bridge portion 38. That upstanding portion 41 is provided with protrusions 42.

The seal, when assembled from the five component sections 11, 12, 21, 22 and 30, is shown clearly in FIG. 2. As can be seen from that Figure, sections 11 and 12 of the first strip of the seal are snap-fitted together by means of respective latch members 17, 18. Similarly, the sections 21 and 22 of the second strip of the seal are snap-fitted together by respective latch members 27, 28 and 26', 28'.

The first and second strips of the seal, as constituted by respective pairs of sections 11, 12 and 21, 22, are interlocated together by the upstanding member 13 which extends between the portion 24 of the section 21 and the portion 23 of the section 22, in generally. sealing but sliding engagement therewith. The member 13 also extends upwardly into the space defined between the portions 24 and 29 of the two sections 21, 22 of the second strip. The downwardly depending lip 13'at the top free end of the interlocated upstanding member 13 is in wiping contact with the inner surface of the portion 24 of the section 21. Also, the downwardly depending portion 23 of the section 22 is received slidingly in the slot 20' between the upstanding portion 20 and the left hand latch member 18 at the left hand end of the portion 19 of the section 12.

The second strip section 22 of the seal is detachably connected to the further section 30 by means of respective pairs of latch members 29', 39', whilst the outwardly projecting elements 33 on the outer surface of the portion 39 of the section 30 abut the inner surface of the portion 29 of the section 22, to provide proper positioning therebetween.

Figure 4:
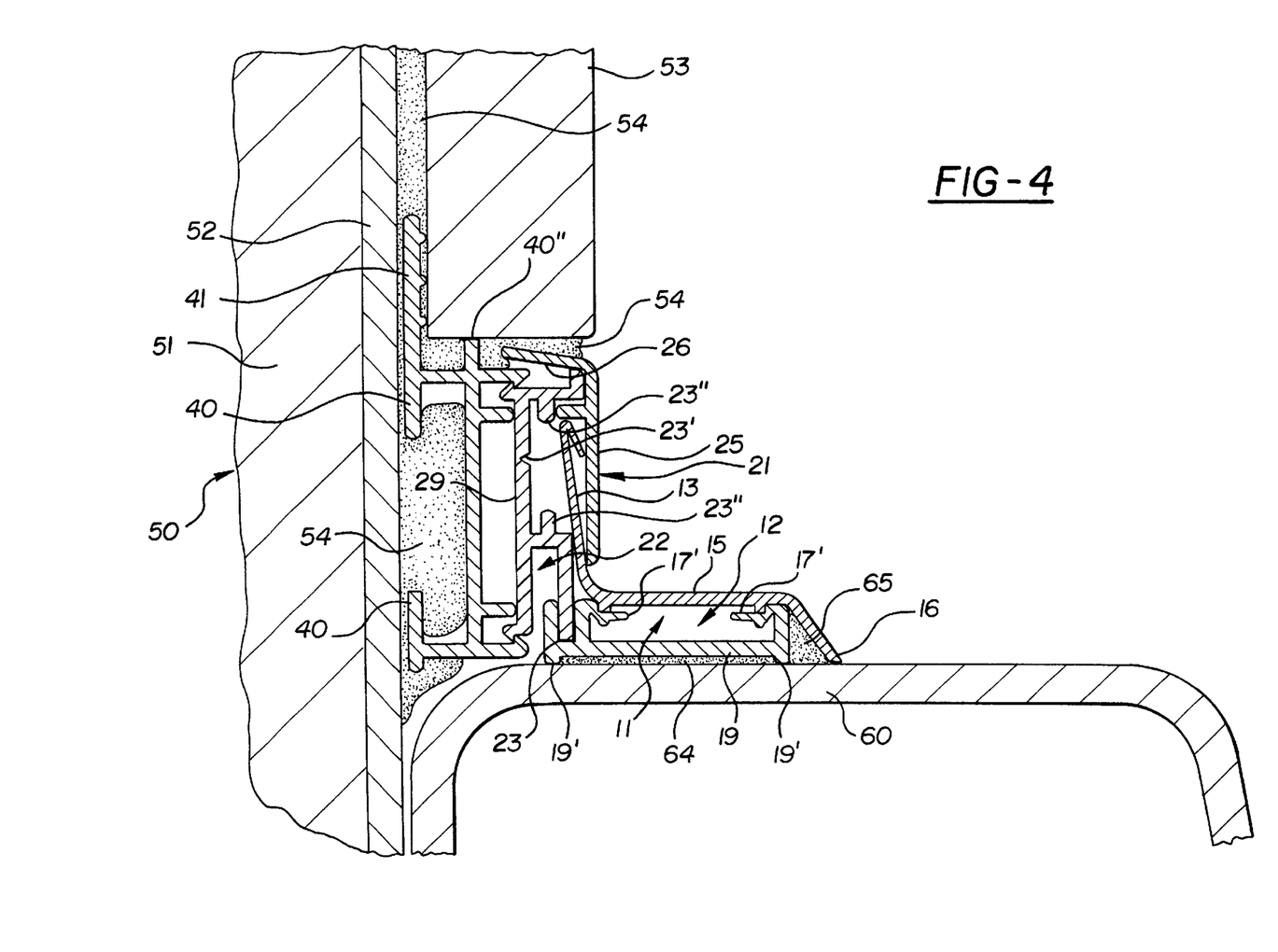
FIG. 4 is a sectional view of the first embodiment of seal shown in FIGS. 1 and 2, also installed between a tiled wall and a bath rim.

In FIG. 4, the assembled seal is shown installed between a tiled wall, indicated generally at 50, and the rim 60 of a bath.

The tiled wall 50 comprises brickwork 51 or the like, a layer 52 of plaster or the like and a row of tiles 53 of which only one is shown.

The tile 53 is secured to the plaster layer 52 by means of an adhesive 54, with the upstanding portion 41 of the further section 30 of the seal embedded in that adhesive 54 between the plaster layer 52 and the tile 53. Sufficient adhesive 54 is applied to the plaster layer 52, such that it extends between the free ends of respective upstanding and depending portions 40, 40' of the section 30 and into the space defined between the portion 39 of that section 30 and the plaster layer 52 and/or the portions 40. Further, a fixing pin may be used to enhance securement of the seal to the wall 51 or plaster layer 52, facilitated by the V-shaped groove 23' in the outer surface of the portion 29 of the section 22.

The portions 40, 40' and 41 of the section 30, as well as a further upstanding portion 40" of the, section 30, provide secure positioning of that section with respect to the plaster layer 52 and tile 53 of the tiled wall 50. At least partially embedded in the adhesive 54 beneath the lower edge of the tile 53 is the inwardly-extending portion 26 of the second strip of the seal. The first strip section 12 of the seal is spaced from the upper surface of the bath rim 60 by the pair of feet 19' and is secured to that upper surface of the bath rim 60 by means of a suitable adhesive or mastic material 64 in the space defined between the lower surface of the portion 19 and the upper surface of the bath rim 16.

A suitable mastic material 65 substantially fills the space between the right hand end of the portion 19 of the section 12, the adjacent upper surface of the bath rim 60 and the downwardly depending lip portion 16 of the section 11 of the first strip of the seal. Also, the lower free end of that lip portion 16 engages the upper surface of the bath rim 60, as well as providing a cover for the mastic material 65.

Thus, it can be seen from FIG. 4 that the second strip of the seal constituted by the sections 21 and 22 are secured to the tiled wall 50, as described above, whilst the first strip of the seal constituted by the sections 11 and 12, is secured to the bath rim 60. However, the first and second strips of the seal are arranged for relative lateral (sectional), substantially vertical movement with respect to each other, due to the manner in which the two strips of the seal are interlocated with respect to each other. Such interlocation is provided by the upstanding member 13 of the first strip section 11 being vertically slidable between the two second strip sections 21 and 22, with the portion 23 being movable within the slot 20' of the first strip section 12. Thus, generally lateral sectional, vertical movement between the bath rim 60 and the tile wall 50 is accommodated by this arrangement, whilst maintaining the integrity of the seal between the bath rim 60 and wall 50. Some longitudinal, generally horizontal, relative movement between the two interlocated strips of the seal, resulting for corresponding horizontal movement between the bath rim 60 and wall 50, can also be accommodated by the seal.

In accordance with the invention, the first strip section 11 and the second strip section 21 of the seal define respective first and second outer surfaces 15, 25 which are substantially contiguous and provide a generally neat and attractive outer facia, as well as a gravity water run-off and drip strip, for the seal when so-installed between the tiled wall 50 and the bath rim 60, and any relative vertical and/or horizontal lengthwise movement therebetween, to maintain a watertight seal between the tiled wall 50 and bath rim 60.

Figure 3:
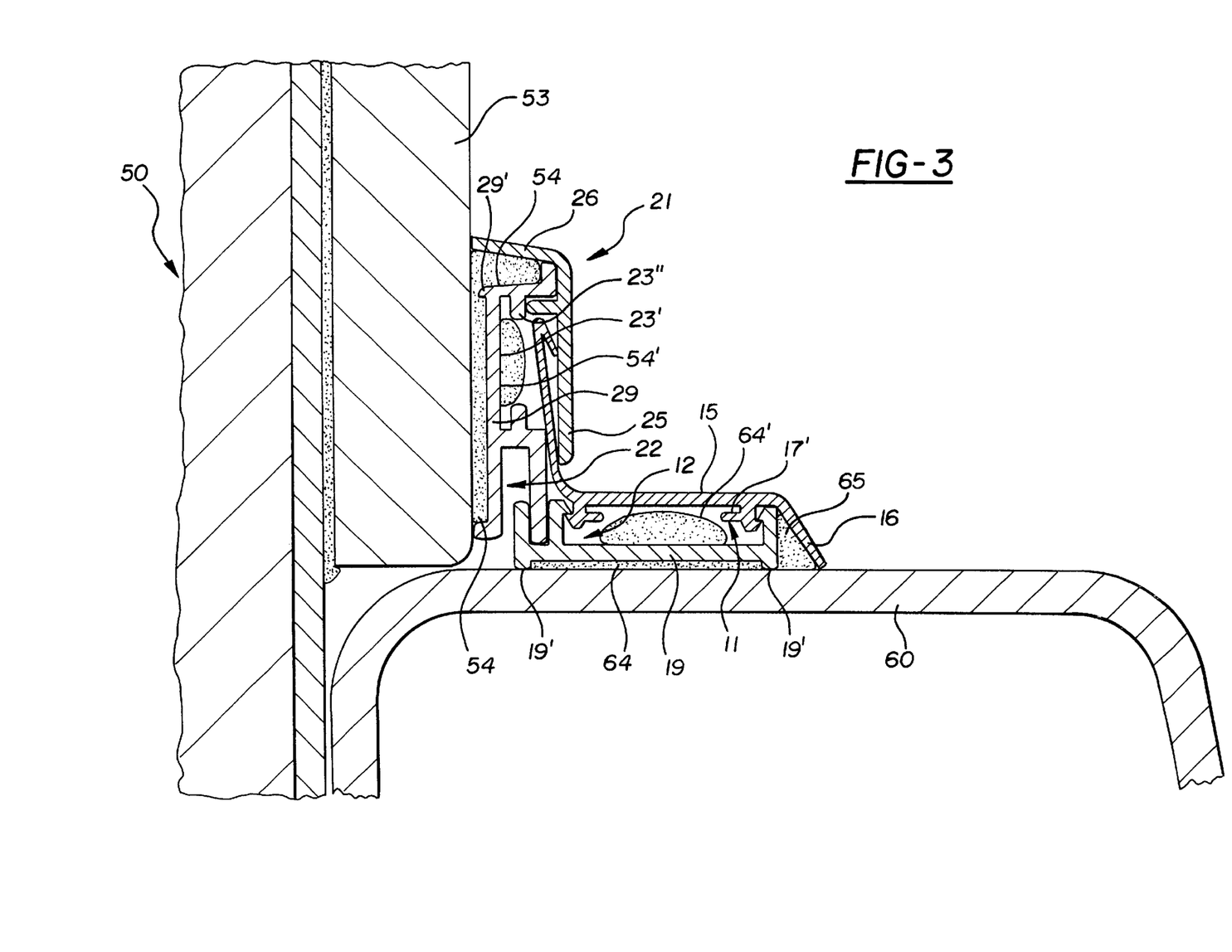
FIG. 3 is a sectional view of a second embodiment of seal installed between a tiled wall and a bath rim.

Turning now to FIG. 3 of the drawings, the second embodiment of seal is similar to the first embodiment described above, except that the further section 30 has been omitted.

In this second embodiment, the seal is provided between an existing tiled wall 50 and an adjacent bath rim 60 but with the second strip of the seal, constituted by the two sections 21 and 22, being secured by a suitable adhesive 54 directly to the outer surface of the tile 53. A space for that adhesive is provided between the inner surface of the portion 29 and outer surface of the tile 53 by means of the would-be latch members 29' acting as feet engaging that outer tile surface. Also, adhesive 54 or mastic is provided beneath the portion 26 of the section 21, which acts as a cover for that adhesive or mastic.

Further, fixing pins (not shown) may be used, via the V-shaped groove 23', to enhance securement of the seal to the row of tiles 53, in which case, such pins may be inserted between adjacent tiles 53, preferably in the grouting therebetween.

The portion 29 of the second strip section 22 of the seal is provided with through holes (not shown) which permit the adhesive 54 to flow partially into the space between the two sections 21 and 22.

Similarly, adhesive or mastic 64 is also permitted to flow through holes (also not shown) in the portion 19 of the first strip section 12, as shown at 64', with mastic 64 being provided in the space defined by the space between the portion 19 and the bath rim 60, which space is provided by the feet 19' resting on the bath rim.

Again, the second strip of the seal is secured to the tiled wall 50, whilst the first strip of the seal is secured to the bath rim 60, such that the first and second strips of the seal can move generally vertically (sectionally) with respect to each other, to accommodate any relative generally vertical movement between the wall 50 and the bath rim 60, whilst the integrity of the seal between the wall 50 and the bath rim 60 is maintained. Again, some relative longitudinal (generally horizontal) movement between the interlocated strips of the seal can also be accommodated.

Further, mastic 65 fills the space defined by the right hand end of the portion 19 of the first strip section 12, the downwardly depending lip 16 of the first strip section 11 and the corresponding portion of the bath rim 60, with that lip 16 acting as a cover for the mastic 65.

The first and second outer surfaces 15 and 25 of the seal, as defined by respective sections 11 and 21 of the first and second strips of the seal, again are generally contiguous with each other, to provide a neat and attractive outer facia surface for the seal, as well as a gravity water run-off and drip strip therefor.

In both embodiments of seal described above with respect to the accompanying drawings, and in accordance with the invention, the interlocated first and second strips of the seal are able to undergo lateral sectional, generally vertical movement with respect to each other but may also be able to accommodate any longitudinal movement therebetween, as a result of corresponding movements between the tiled wall 50 and the bath rim 60.

Additionally, because the first and second strips of the seal are each constituted by two sections, namely, 11, 12 and 21, 22, installation of the seal is facilitated. Further, this permits different shapes and/or colours of the sections 11 and 21 of the seal to be employed or interchanged with generally standard shapes and/or colours of sections 12 and 22 of the seal.

Ingress of water or other fluids into the interior of the seal is also prevented or at least substantially reduced, due to the sealing interlocation between the first and second strips of the seal, as well as the covered adhesive 54 and mastic 65 provided respectively by the cover portion 26 and depending lip 16, of the first strip, thereby maintaining or substantially enhancing the integrity of the installed seal.

Further, the first outer surface-defining section 11 of the first strip of the seal has a pair of opposed flanges 17', as shown in FIG. 1, which define with the adjacent lower surface of the section portion 14 a pair of spaced slots 14' for receiving therein opposed edge regions of one end of a generally L-shaped (in plan) plate (not shown) for joining together adjacent ends of two lengths of seal at right angles to each other. Such a plate may be made of any suitable material, such as a metallic or plastics material, and acts to align and reinforce the so-formed corner.

Similarly, the section 22 of the second seal strip has a pair of opposed flanges 23", as shown again in FIG. 1, which define with the adjacent outer surface of the portion 29 a pair of spaced slots 29" for receiving therein opposed edge regions of one end of a generally L-shaped (in section) plate also not shown) for joining together adjacent ends of two lengths of seal at right angles to each other. Again, such a plate may be made of any suitable material, such as a metallic or plastics material, and acts to align and reinforce the so-formed corner.

As indicated above, the inventive seal may be provided in the form of a kit of parts comprising at least:

the first and second outer surface-defining sections 11, 21 of respective first and second strips of the seal;

at least one, and preferably both of the respective additional sections 12, 22 therefor; and the further section 30 to which the additional section 12, 22 of the corresponding first or second strip is detachably secured or securable.

Such a kit preferably comprises five parts, namely the first and second outer-surface defining sections 11, 21, both additional sections 12, 22 therefor and the further section 30.

When the seal is to be installed between, say, the rim of a bath 60 and a wall 51 during tiling thereof, a portion 41 of the further section 30 can be located behind a row of tiles 53 whilst they are being adhered to the wall 51 via its plaster layer 52, as in the case of the embodiment described above with reference to FIG. 4.

Alternatively, when the seal is installed between, say, the rim of a bath 60 and an existing tiled wall 50, as shown in FIG. 3, then the further section 30 can be discarded and the additional section 22 of, say, the second strip of the seal can be adhered at 54 directly to an existing row of tiles 53.

If, however, the seal is to be installed between a wall and floor in the region of the juncture thereof, then the kit may comprise six basic parts, namely the first and second outer surface-defining sections 11, 21, both additional sections 12, 22 and two further sections 30 attached or to be attached to respective ones of the two additional sections 12, 22, so that portions 41 of the respective further sections 30 can be applied behind a row of wall tiles, or other wall covering, and beneath a row of floor tiles, or other floor covering, during installation thereof.

Alternatively, one or both of the further sections 30 can be discarded if one or both of the additional strip sections 22 is/are to be secured directly to either an existing wall or floor covering or both.

Figure 5:
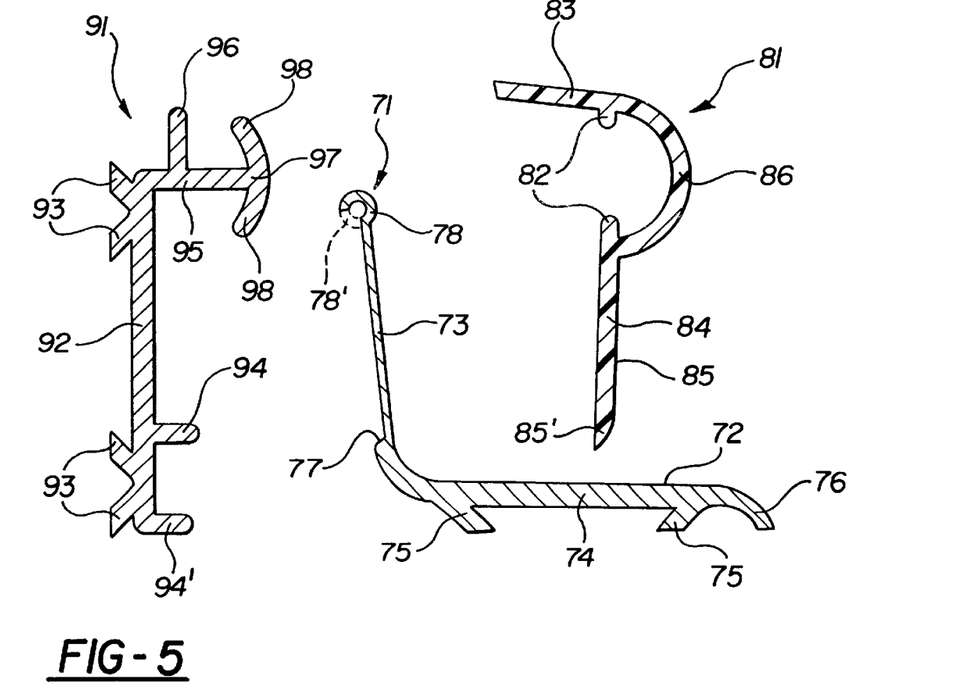
FIG. 5 is an exploded, sectional view of a third embodiment of seal.
Figure 6:
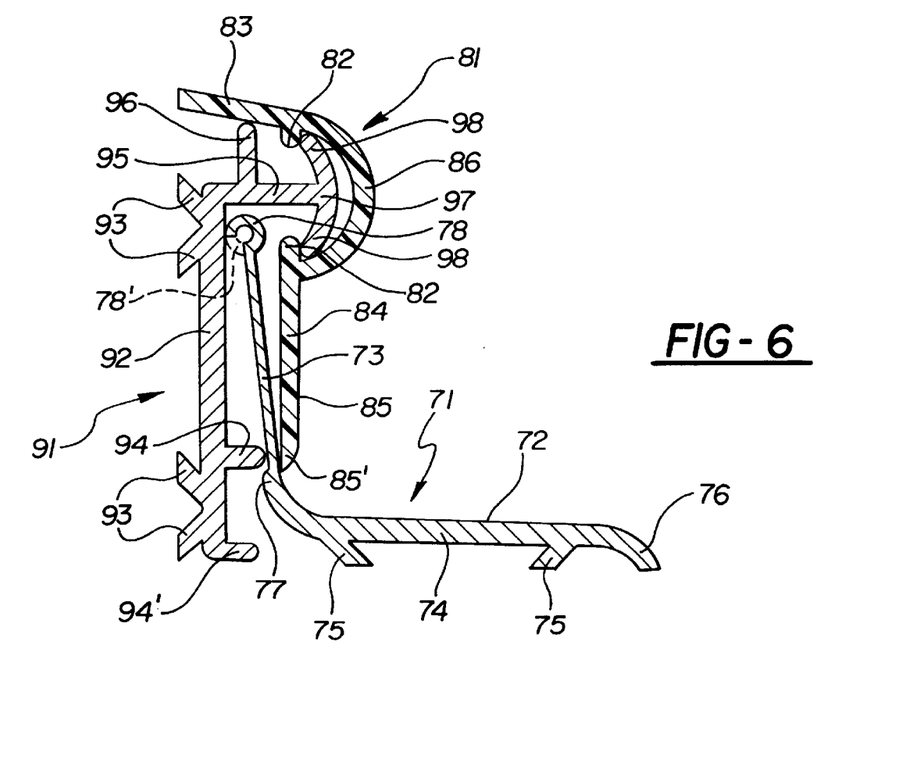
FIG. 6 is a sectional view of the seal of FIG. 5 in an assembled condition.

Referring now to FIGS. 5 and 6, a third embodiment of seal comprises three basic component sections 71, 81, 91 each extruded from a plastics material.

The section 71 constitutes a first strip of the seal defining a first outer surface 72 of the seal and having an upstanding member 73 which is interlocatable, by engagement, with a second strip of the seal constituted by the component section 81. A portion 84 of the second strip section 81 of the seal defines a second outer surface 85 thereof Another, generally semi-circular portion 86 of the section 81, extends from the upper region of the portion 84 and is extended by a further, generally straight portion 83. A pair of opposed inner latch members 82 are provided at respective junctures between opposed ends of the portion 86 and the portions 83 and 84.

The first strip section 71 also comprises: a portion 74 whose upper surface constitutes the first outer surface 72 of the seal; a pair of downwardly inclined feet 75 at opposed ends of the portion 74; a downwardly depending lip portion 76; an inner shoulder 77 at the lower end of the upstanding member 73; and a hook-shaped portion 78 at the other, upper end of the member 73. As an alternative, the portion at the other, upper end of the member 73 may be a ring or annular portion, as shown in dashed lines at 78'.

The second section 81 of the seal is securable to the third, additional component section 91 which comprises a portion 92 having, at respective opposed ends thereof, pairs of outer feet 93. At the lower end of that portion 92 are provided two inner legs 94, 94' and at the upper end thereof, an inner arm 95 having an upwardly extending leg 96 and, at the inner end thereof, an arcuate element 97 whose opposed free ends constitute latch members 98.

In the assembled third embodiment of seal, as shown in FIG. 6, the second strip section 81 is secured to the third, additional section 91 by means of a snap-fit between the latch members 98 of the arcuate element 97 and the latch members 82 of the section 81. The straight portion 83 of that section 81 is engaged by the upper free end of the leg 96 of the third section 91 preferably to provide a watertight seal therebetween. The free end of the leg 94 similarly engages the inner surface of the upstanding member 73 of the first strip section 71, adjacent the shoulder 77 thereof whilst the lower free end of the portion 84 of the second strip section 81 engages the outer surface of the member 73 of the first strip section 71, again adjacent the shoulder 77 thereof Further, the hook-shaped or ring portion 78, 78' of the first strip section 71 engages the inner surface of the portion 92 of the third, additional section 91 adjacent the upper end thereof.

Figure 7:
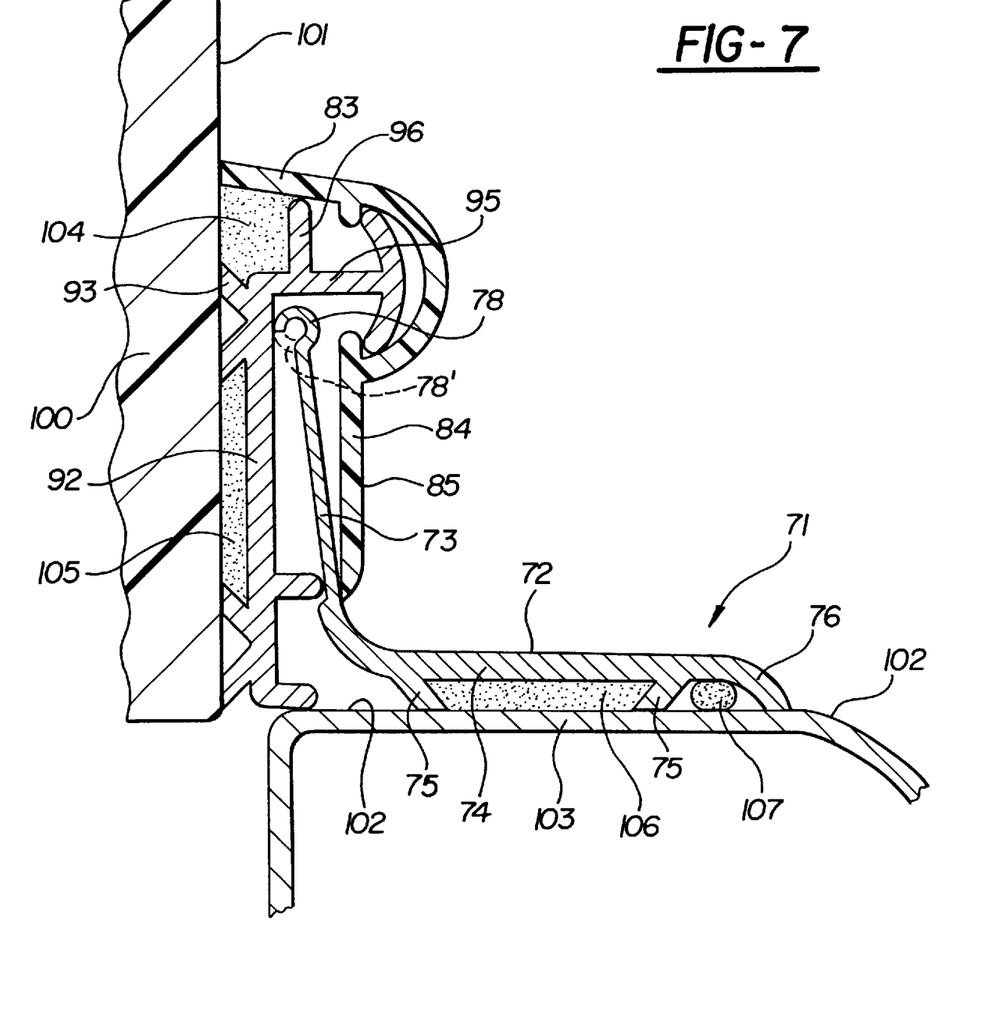
FIG. 7 is a sectional view of the assembled seal of FIG. 6 installed between a wall and a bath rim.

In FIG. 7, the assembled seal of FIG. 6 is shown installed between a generally vertical surface 101 of, say, a wall or wall tile 100 and the upper surface 102 of the rim 103 of a bath.

The second and third seal sections 81, 91 are attached and sealed to the vertical wall or tile surface 101 by means of a suitable sealant adhesive or mastic 104 accommodated within the space defined by part of the inner surface of the portion 83 of the second section 81, part of the inner arm 95, the leg 96, the uppermost foot 93 of the section 91 and the surface 101. Also, a suitable sealant adhesive or mastic 105 is provided, for such attachment, between the portion 92 of the section 91 and the vertical surface 101, intermediate the feet 93. Similarly, a sealant adhesive or mastic 106 is provided between the upper surface 102 of the bath rim 103 and the portion 74 of the first seal section 71 intermediate the feet 75 thereof, to at least partially assist in the sealing attachment of the first section 71 to the bath rim 103. Additionally, a preformed sealant adhesive strip 107, such as a butyl strip, is provided in the space defined by the foot 75 and lip 76 of the first section 71 and the upper surface 102 of the bath rim 103.

Thus, the portion 84 of the second strip section 81, which overlies the upstanding member 73 of the first strip section 71, provides a second outer surface 85 which is generally contiguous with the first outer surface 72 defined by the portion 74 of the first strip section 71, whilst the additional, third section 91 to which the second strip section 81 is secured, is secured to the adjacent vertical surface 101. Moreover, the sliding location of the upstanding member 73 of the first seal section 71 between the second and third sections 81, 91, permits relative movement therebetween, to take up any vertical and/or horizontal lengthwise movement between the wall or tile 100 and the bath rim 103 during use, whilst maintaining a watertight seal between the wall or tile 100 and the bath rim 103.

Figure 8:
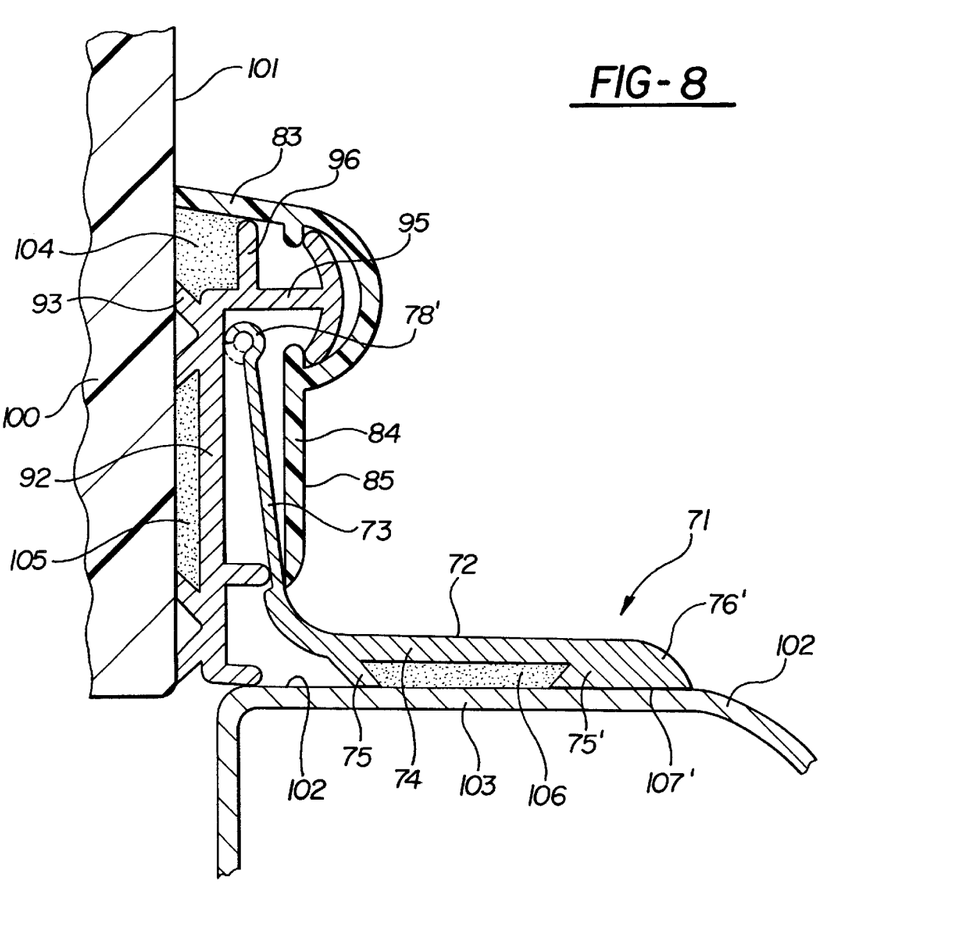
FIG. 8 is a sectional view of an assembled seal which is a modification of that shown in FIGS. 5 to 7.

FIG. 8 shows an assembled seal which is a modification of the third embodiment of seal described above with reference to FIGS. 5 to 7 of the accompanying drawings. Here, the outer one of the pair of downwardly inclined feet 75 of the section 71 of the third embodiment is effectively retained at 75', as is the lip 76 and 76'. However, the space in which the butyl strip 107 is provided and which, in the third embodiment, is defined by the outer foot 75, the lip 76 and the adjacent upper surface 102 of the bath rim 103, is omitted and replaced by the material of the seal, with double-sided adhesive tape 107' located therebetween.

As in the case of the first two embodiments of seal described above in relation to FIG. 1 to 4, the third embodiment of seal of FIGS. 5 to 7, and the modification thereof of FIG. 8, may be supplied as a kit but in three component parts, namely the three seal sections 71, 81 and 91.

Accordingly and as indicated above, it is to be appreciated that the invention provides a watertight seal between a pair of inclined surfaces, with the. first and second strips of the embodiments discussed above in relation to the accompanying drawings, being capable of telescopic movement therebetween, without the integrity of the seals in the installations being jeopardised, even with telescopic movement between the strips of several millimeters. Also, sliding engagement between the sections of the two strips enables smooth telescopic movement between the strips, whilst also maintaining the integrity of the seals. Moreover, the ability to detach the outer surface-defining sections from the additional strip section, enables installation of the seal to be facilitated, as discussed above and as provided by the embodiments.

What is claimed is:

1. An installation comprising two surfaces which are arranged at substantial right angles to each other and which are capable of relative movement during use and a waterproof seal between the two surfaces at the juncture thereof, the seal comprising:

a first strip section secured to one of said first and second surfaces and having a portion defining a first outer surface of the seal and a member which upstands at substantial right angles with respect to said one surface;

a second strip section having a portion at least partially overlying the first strip portion in sliding engagement therewith, to define a second outer surface of the seal; and an additional section which is secured to the other of said first and second surfaces and to which the second strip section is secured, wherein the second strip and additional sections define therebetween a slot in which the upstanding member of the first strip section is substantially freely interlocated, to allow substantially free telescopic movement between the first strip section and the second strip and additional sections when viewed in cross-section and when the two surfaces undergo relative movement during use.

2. An installation according to claim 1, wherein the upstanding member is a part of the first outer surface-defining portion of the first strip section.

3. An installation according to claim 1, wherein the upstanding member of the first strip section has a lip which is in sliding and wiping contact with an adjacent inner surface of the second strip section, to assist in the prevention of the ingress of water into the interior of the seal.

4. An installation according to claim 3, wherein the adjacent inner surface of the second strip section is an inner surface of the second outer surface-defining portion of that strip remote from or opposite the second outer surface defined thereby.

5. An installation according to claim 1, wherein the upstanding member of the first strip section has a hook-shaped or annular portion which is in sliding engagement with an inner surface of the additional section.

6. An installation according to claim 1, wherein both the first strip and additional sections have respective further sections including means for positioning themselves in proper relationship with respect to each other.

7. An installation according to claim 6, wherein said positioning means comprises complementary formations on the respective further sections.

8. An installation according to claim 6, wherein said positioning means comprises a loose-fit male/female arrangement, to allow for the said telescopic movement between the first strip section and the second strip and additional sections.

9. An installation according to claim 6, wherein said positioning means comprises a loose-fit male/female arrangement, to allow for substantially free relative longitudinal movement between the first strip section and the second strip and additional sections.

10. An installation according to claim 1, wherein the so-defined first and second outer surfaces of the seal are substantially contiguous with each other, to provide an overall outer facia surface for the seal, as well as a gravity water run-off.

11. An installation according to claim 10, wherein the contiguous first and second outer surfaces also provide a drip strip for the seal.

12. An installation according to claim 1, wherein the second strip section is detachably secured to the additional section by a snap-fit therebetween.

13. An installation according to claim 1, wherein the first outer surface-defining portion of the first strip section has a lip portion which engages the surface to which the first strip section is secured.

14. An installation according to claim 13, wherein the lip portion provides a cover for mastic, adhesive or double-sided adhesive tape located thereunder.

15. An installation according to claim 13, wherein the lip portion is remote from the upstanding member.

16. An installation according to claim 1, wherein the additional section has at least one foot spacing that section, and hence the second strip section, from the surface to which the additional section is secured.

17. An installation according to claim 16, wherein the so-formed space between the additional section and adjacent surface accommodates an adhesive, such as a mastic, sealingly securing that section to that surface.

18. An installation according to claim 1, wherein the first strip section has at least one foot spacing that section from the surface to which it is secured.

19. An installation according to claim 18, when the so-formed space between the first strip section and adjacent surface accommodates an adhesive, such as mastic, sealingly securing that section to that surface.

20. An installation according to claim 1, wherein the additional section has a through hole through which adhesive and/or mastic has flowed and set, to enhance the sealing effect between the seal and adjacent surface.

21. An installation according to claim 1, wherein both the first strip and additional sections are detachably attached to respective further sections secured to respective ones of the surfaces.

22. An installation according to claim 1, wherein the sections of the seal are extruded from a flexible waterproof material.

23. An installation according to claim 1, wherein the sections of the seal are preformed.

24. An installation according to claim wherein the second strip section is detachably secured to the additional section.

* * * * *